United States Patent
Heine et al.

(10) Patent No.: US 12,342,768 B2
(45) Date of Patent: Jul. 1, 2025

(54) TREE PRUNER

(71) Applicant: Fiskars Finland Oy Ab, Espoo (FI)

(72) Inventors: Mikko Heine, Espoo (FI); Niko Rusanen, Espoo (FI); Erkki Seppäläinen, Kauniainen (FI); Pekka Lemmetyinen, Salo (FI); Thomas Nyholm, Helsinki (FI)

(73) Assignee: Fiskars Finland Oy Ab, Espoo (FI)

( * ) Notice: Subject to any disclaimer, the term of this patent is extended or adjusted under 35 U.S.C. 154(b) by 252 days.

(21) Appl. No.: 18/107,728

(22) Filed: Feb. 9, 2023

(65) Prior Publication Data
US 2024/0268276 A1    Aug. 15, 2024

(51) Int. Cl.
*A01G 3/037*    (2006.01)
*A01G 3/033*    (2006.01)

(52) U.S. Cl.
CPC ........... *A01G 3/037* (2013.01); *A01G 3/0335* (2013.01)

(58) Field of Classification Search
CPC .... A01G 3/0255; A01G 3/0335; A01G 3/037; A01G 3/053; B26B 15/00
See application file for complete search history.

(56) References Cited

U.S. PATENT DOCUMENTS

| | | | |
|---|---|---|---|
| 3,360,858 A | | 1/1968 | Cowley |
| 2018/0103593 A1 | * | 4/2018 | Zador ............... B26B 15/00 |
| 2021/0068349 A1 | * | 3/2021 | Sabic ............... A01G 3/037 |
| 2021/0076572 A1 | | 3/2021 | Lam et al. |
| 2024/0415066 A1 | * | 12/2024 | Rusanen ............ A01G 3/037 |

FOREIGN PATENT DOCUMENTS

| | | | | | |
|---|---|---|---|---|---|
| CN | 204518583 U | * | 8/2015 | | |
| CN | 105409607 A | * | 3/2016 | ........... | A01G 3/0335 |
| CN | 108668669 A | * | 10/2018 | ........... | A01G 3/0335 |
| DE | 19815009 A1 | * | 10/1999 | ........... | A01G 3/037 |
| DE | 102015206424 B4 | * | 12/2021 | ........... | A01G 3/0335 |
| KR | 100779515 B1 | * | 11/2007 | ........... | A01G 3/0255 |
| KR | 20120003461 U | * | 5/2012 | ........... | B26B 15/00 |
| KR | 2016104497 A | * | 9/2016 | ........... | A01G 3/0335 |
| WO | WO-2020/094249 A1 | | 5/2023 | | |

OTHER PUBLICATIONS

DE-102015206424-B4 English Translation; Dec. 2, 2021 Drescher, A01G3/0335.*
DE19815009 English Translation; Oct. 7, 1999; A01G3/037; Gardena Kress.*
First Opinion on Patentability and Search Report for Finnish U.S. Appl. No. 20/235,167, dated Jun. 27, 2023, 9 pages.

* cited by examiner

*Primary Examiner* — Laura M Lee
(74) *Attorney, Agent, or Firm* — FOLEY & LARDNER LLP

(57) ABSTRACT

A tree pruner includes a pruner body, a blade system, and an electric motor to provide driving power for the blade system. Rotation of the electric motor in a first direction provides a cutting action. A control system controls the electric motor, and a transmission system having a transmission rope transfers power from the electric motor to the blade system. The tree pruner includes a tension management system to detect a slack rope situation in which tension of the transmission rope is below a predetermined limit value, and the control system prevents rotation of the electric motor in a second direction opposite to the first direction as a response to detection of the slack rope situation.

14 Claims, 2 Drawing Sheets

TREE PRUNER

TECHNICAL FIELD

The present invention relates to a tree pruner.

BACKGROUND

Document US2021/0076572A1 discloses a known pruner. The known pruner comprises an electric motor connected to a pruner body, and a transmission system adapted to transfer power from the electric motor to a blade system. The transmission system comprises a rope, and a screw and a nut rotatably connected to the screw.

One of the disadvantages associated with the above known pruner is that in a situation where the blade system gets stuck in connection with a cutting action, there is a risk that the rope of the transmission system gets fouled.

SUMMARY

An object of the present invention is to provide a tree pruner so as to alleviate the above disadvantage. The objects of the invention are achieved by a tree pruner which is characterized by what is stated in the independent claim. The preferred embodiments of the invention are disclosed in the dependent claims.

The invention is based on the idea of providing the tree pruner with a tension management system adapted to detect a slack rope situation in which tension of the transmission rope is below a predetermined limit value, wherein a control system is adapted to control the electric motor as a response to detection of the slack rope situation such that a risk of the transmission rope getting fouled is reduced.

BRIEF DESCRIPTION OF THE DRAWINGS

In the following the invention will be described in greater detail by means of preferred embodiments with reference to the attached drawings, in which.

DETAILED DESCRIPTION

Figure 1:
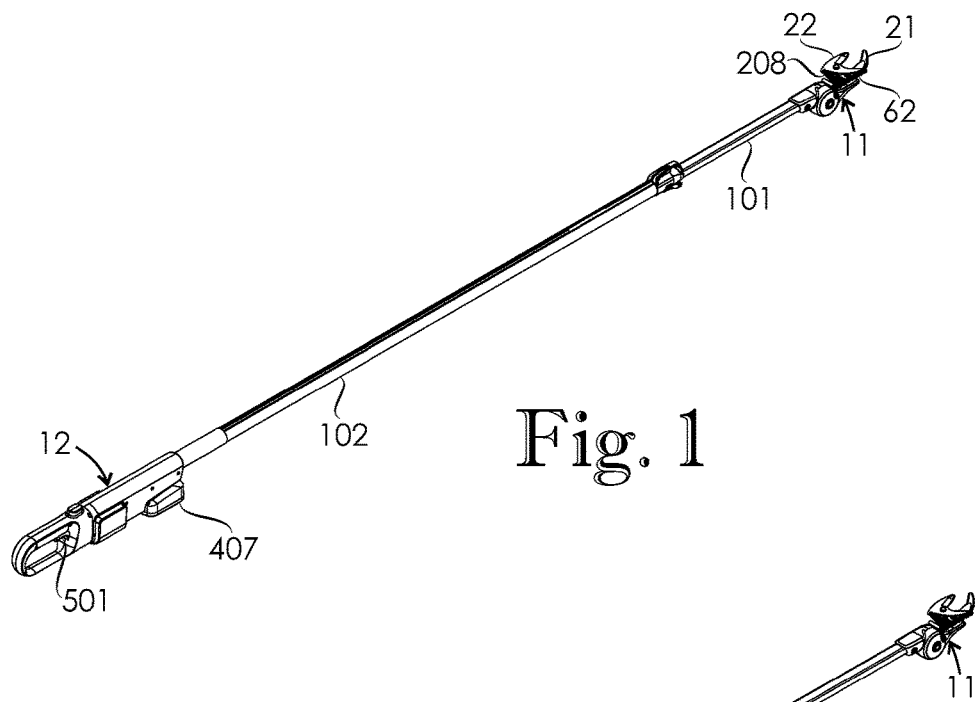
FIG. 1 shows a tree pruner according to an embodiment of the invention.

FIG. 1 shows a tree pruner comprising a pruner body and a blade system. The pruner body comprises a first body section 11 and a second body section 12 spaced apart in a longitudinal direction of the pruner body. The blade system is connected to the first body section 11, and comprises a first blade 21 and a second blade 22 adapted to co-operate with each other for cutting branches.

The first blade 21 and the second blade 22 are adapted to move relative to each other such that the blade system has a blades-open position and a cutting position. In FIG. 1, the blade system is in the blades-open position.

The first blade 21 is stationarily connected relative to the first body section 11, and the second blade 22 is rotatably connected relative to the first body section 11. The first blade 21 and second blade 22 are adapted to co-operate as bypass blades for cutting branches. In an alternative embodiment, the first blade and second blade are adapted to co-operate as anvil blades for cutting branches.

Figure 2:
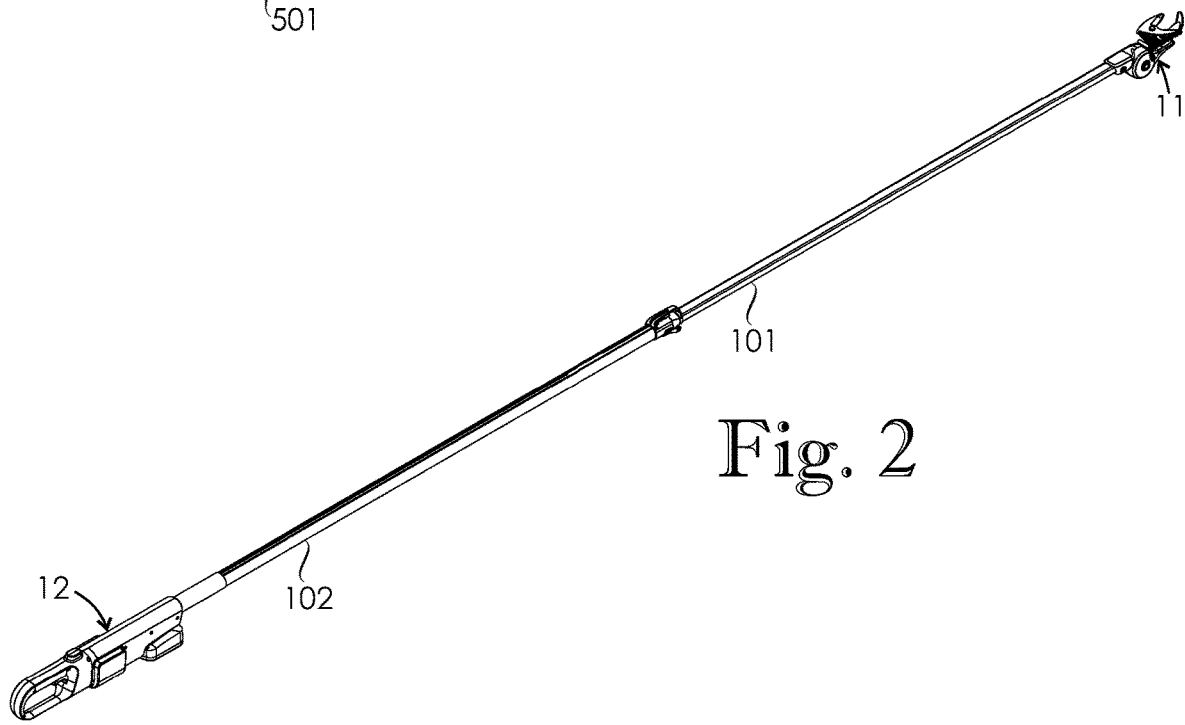
FIG. 2 shows the tree pruner of FIG. 1 in another operating position in which a telescopic structure of the tree pruner is in an extended state.

The pruner body has a telescopic structure such that a distance between the first body section 11 and the second body section 12 is adjustable. FIG. 2 shows the tree pruner of FIG. 1 in another operating position in which the telescopic structure of the tree pruner is in an extended state compared to the one shown in FIG. 1.

Figure 3A:
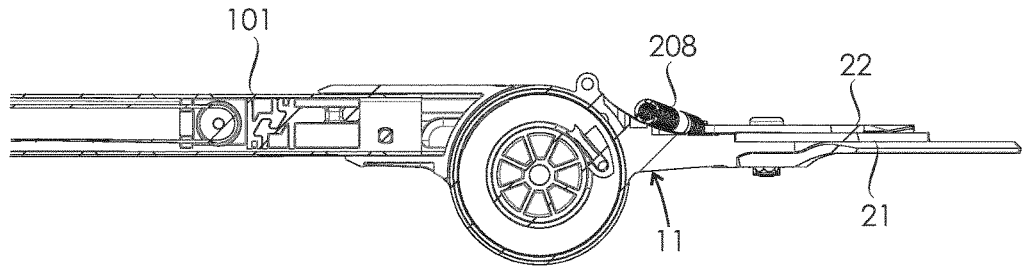
FIG. 3A shows a cross section of a first end of the tree pruner of FIG. 1 as seen from right side.
Figure 3B:
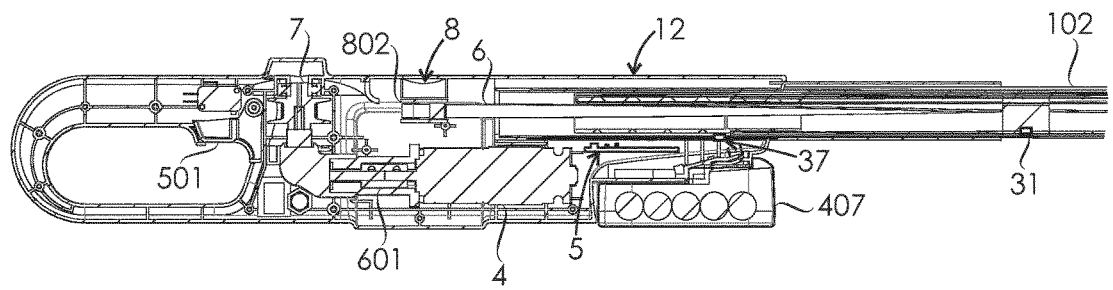
FIG. 3B shows a cross section of a second end of the tree pruner of FIG. 1 as seen from right side.
Figure 4A:
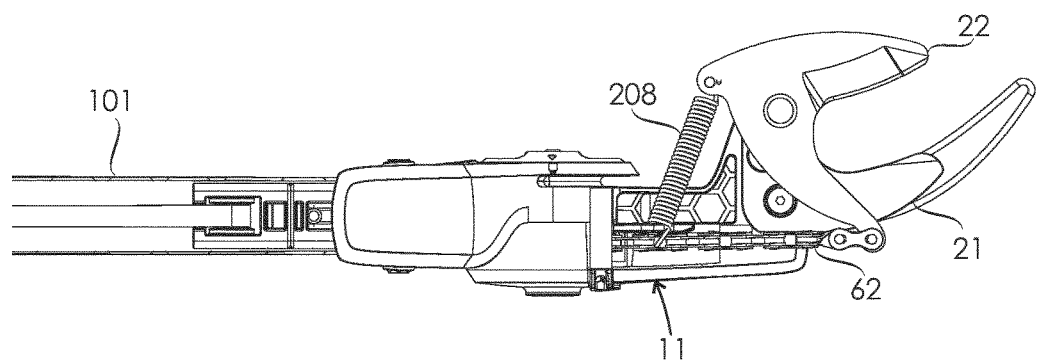
FIG. 4A shows a cross section of the first end of the tree pruner of FIG. 1 as seen from above.
Figure 4B:
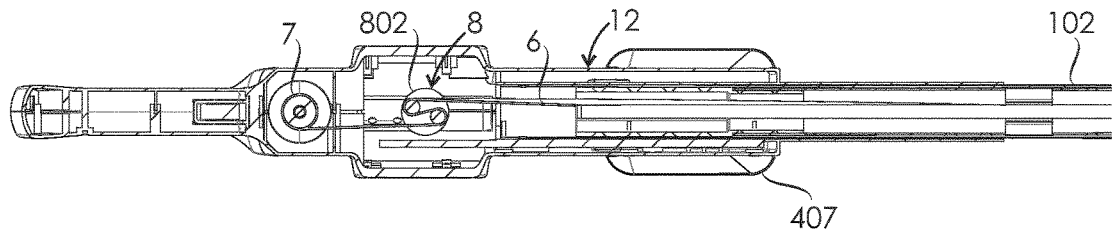
FIG. 4B shows a cross section of the second end of the tree pruner of FIG. 1 as seen from above.

FIGS. 3A to 4B show cross sections of end portions of the tree pruner of FIG. 1. FIG. 3A shows a cross section of a first end as seen from right side. FIG. 3B shows a cross section of a second end as seen from right side. FIG. 4A shows a cross section of the first end as seen from above. FIG. 4B shows a cross section of the second end as seen from above.

The tree pruner is an electric tree pruner comprising an electric motor 4, a control system 5 adapted to control the electric motor 4, a transmission system adapted to transfer power from the electric motor 4 to the blade system, a tension management system 8, and a position detection system.

The electric motor 4 is connected to the second body section 12, and is adapted to provide driving power for the blade system. Rotation of the electric motor 4 in a first direction is adapted to provide a cutting action in which the blade system moves from the blades-open position towards the cutting position. A battery 407 is adapted to provide power to the electric motor 4.

The transmission system is adapted to transfer power from the electric motor 4 to the blade system. The transmission system comprises a reduction gear 601, a rope reel 7, a transmission rope 6 and a transmission chain 62.

A first end of the transmission rope 6 is connected to the blade system through the transmission chain 62, and a second end of the transmission rope 6 is connected to the electric motor 4 such that rotation of the electric motor 4 in the first direction is adapted to pull the first end of the transmission rope 6 towards the second body section 12 in the longitudinal direction. In an alternative embodiment, a first end of the transmission rope is directly connected to the blade system.

The blade system is adapted such that a movement of the blade system between the blades-open position and the cutting position is provided by an operation movement of the first end of the transmission rope 6. A length of the operation movement is 350 mm. In an alternative embodiment, a length of the operation movement is in a range of 100-500 mm.

The pruner body comprises a first tube 101 and a second tube 102 such that the first tube 101 extends partially inside the second tube 102 in order to provide the telescopic structure of the pruner body. The transmission rope 6 extends inside the first tube 101 and the second tube 102.

The first body section 11 is adapted to be rotated relative to the second body section 12 around a rotation axis perpendicular to the longitudinal direction of the pruner body. In FIG. 3A said rotation axis is perpendicular to the image plane, and in FIG. 4A said rotation axis is vertical.

The transmission rope 6 comprises aramid material, and comprises a woven part. A cross section of the transmission rope 6 is rectangular such that a width of the transmission rope 6 is greater than a thickness thereof. In an embodiment, a width of the transmission rope is greater than or equal to 300% of a thickness of the transmission rope. In an alternative embodiment, a cross section of the transmission rope is circular.

The rope reel 7 is adapted to receive a portion of the transmission rope 6 around it, and the electric motor 4 is adapted to rotate the rope reel 7. Herein, expression "transmission rope" is intended to cover all flexible elongated structures which can be wound on a rope reel, and which are capable of transferring power from the electric motor to the blade system. Therefore, expression "transmission rope" covers a string and a belt, for example.

The tension management system 8 is communicatively connected to the control system 5 and is adapted to detect a slack rope situation in which tension of the transmission rope 6 is below a predetermined limit value. The control system 5 is adapted to prevent rotation of the electric motor 4 in a second direction opposite to the first direction as a response to detection of the slack rope situation. Thus, the tension management system 8, together with the control system 5, is adapted to reduce a risk of the transmission rope 6 getting fouled.

The tension management system 8 comprises a spring-loaded rope tensioner 802. The tension management system 8 is adapted to detect the slack rope situation based on a position of the spring-loaded rope tensioner 802. The spring-loaded tensioner may comprise a known tensioner.

The spring-loaded rope tensioner 802 is adapted to receive a tensioning length of the transmission rope 6 such that the spring-loaded rope tensioner 802 is capable of compensating a stretch having a length of the tensioning length. The tensioning length is 30 mm. In an alternative embodiment, the tensioning length is in a range of 15-100 mm.

The tensioning length is less than or equal to 50% of the length of the operation movement. In an alternative embodiment the tensioning length is less than or equal to 25% of the length of the operation movement.

In an embodiment, the tension management system is adapted to provide a slack rope alert to a user of the tree pruner as a response to a detected slack rope situation. The slack rope alert comprises an audio signal and/or a visual signal.

The blade system comprises a return spring 208 adapted for returning the blade system to the blades-open position if the blade system is deflected therefrom in the direction of the cutting position. The transmission system comprises such a transmission ratio between the electric motor 4 and the blade system that the return spring 208 is not capable of rotating the electric motor 4 in the second direction through the transmission system.

The position detection system is adapted to detect the cutting position of the blade system, and the control system 5 is adapted to control rotation of the electric motor 4 as a response to detection of the cutting position. In an alternative embodiment (not depicted), the position detection system is adapted to detect a plurality of positions of the blade system, and the control system is adapted to control rotation of the electric motor as a response to detection of the plurality of positions of the blade system, as described below. The plurality of positions of the blade system comprises the blades-open position and the cutting position. In another alternative embodiment, the position detection system is adapted to detect at least one position of the blade system, and the control system is adapted to control rotation of the electric motor as a response to detection of the at least one position of the blade system.

The position detection system comprises a first locating mark element 31 connected to the transmission rope 6, and a position sensor 37 connected to the second body section 12 such that the first locating mark element 31 and the position sensor 37 are adapted to co-operate for detecting the cutting position.

In the alternative embodiment in which the position detection system is adapted to detect a plurality of positions of the blade system, the position detection system comprises a plurality of locating mark elements connected to the transmission rope such that the plurality of locating mark elements and the position sensor are adapted to co-operate for detecting the plurality of positions of the blade system. The locating mark elements are spaced apart from each other along a length of the transmission rope.

The plurality of locating mark elements comprises the first locating mark element and a second locating mark element. In an alternative embodiment, the position detection system comprises one locating mark element for each of the plurality of positions of the blade system detectable by the position detection system.

The first locating mark element 31 and the position sensor 37 are adapted to co-operate for detecting the cutting position. The control system 5 is adapted to stop rotation of the electric motor 4 in the first direction as a response to detection of the cutting position. In another embodiment, the control system is adapted to stop rotation of the electric motor in the first direction, and to control the electric motor to rotate in the second direction as a response to detection of the cutting position. This automatic operation is adapted to return the blade system to the blades-open position after a cutting action.

An advantage of automatically stopping rotation of the electric motor 4 in the first direction as a response to detection of the cutting position is that said automatic stopping prevents harmful stress on the transmission system, electric motor 4, and blade system. Without the automatic stopping, there would be a risk that the electric motor 4 would continue to pull the transmission rope 6 after the blade system has reached the mechanical extreme position thereof in a cutting direction, thereby inducing unnecessary stress on the transmission system, electric motor 4, and blade system.

The second locating mark element and the position sensor are adapted to co-operate for detecting the blades-open position. The control system is adapted to stop rotation of the electric motor in the second direction as a response to detection of the blades-open position. This automatic operation is adapted to prevent an unwanted situation in which the blade system reaches an extreme position thereof in an opening direction, but the electric motor continues to rotate in the second direction. If allowed to continue, said unwanted situation would eventually lead to the slack rope situation.

The extreme position of the blade system in the opening direction is the blades-open position. In an alternative embodiment, the extreme position of the blade system in the opening direction is a position slightly beyond the blades-open position.

The control system 5 comprises an operating switch 501 adapted to be manually operated. The control system 5 is adapted to control the electric motor 4 to rotate in the second direction as a response to a situation in which a user of the tree pruner releases grip from the operating switch 501. This automatic operation is adapted to return the blade system to the blades-open position if the user of the tree pruner stops a cutting action before the blade system reaches the cutting position.

Detection of the slack rope situation overrides all automatic and manual operations. The control system 5 is adapted to prevent rotation of the electric motor 4 in the second direction until the slack rope situation is no longer present.

The slack rope situation may be caused by a situation in which the blade system is stuck such that the return spring 208 is not capable of returning the blade system to the blades-open position even when there is no tension in the transmission rope 6. Removing or clearing the slack rope situation may require manually removing reasons causing the blade system being stuck.

The first locating mark element 31 comprises a magnet, and the position sensor 37 comprises a Hall sensor.

In the alternative embodiment in which the position detection system is adapted to detect a plurality of positions of the blade system, each of the plurality of locating mark elements comprises a magnet, and the position sensor comprises a Hall sensor. The position sensor comprises exactly one Hall sensor element, and the magnets of the first locating mark element and second locating mark element are adapted to provide different type of magnetic fields such that the exactly one Hall sensor element is capable of distinguishing the first locating mark element from the second locating mark element. In an embodiment, orientations and/or magnitudes of the magnetic fields of magnets of the first locating mark element and second locating mark element are different from each other.

In an alternative embodiment, the position sensor comprises one Hall sensor element for each of the plurality of locating mark elements. The Hall sensor elements may be spaced apart in the longitudinal direction of the pruner body.

It will be obvious to a person skilled in the art that the inventive concept can be implemented in various ways. The invention and its embodiments are not limited to the examples described above but may vary within the scope of the claims.

What is claimed is:

1. A tree pruner comprising:
   a pruner body comprising a first body section and a second body section spaced apart in a longitudinal direction of the pruner body;
   a blade system connected to the first body section, the blade system comprising a first blade and a second blade adapted to co-operate with each other for cutting branches, wherein the first blade and the second blade are adapted to move relative to each other such that the blade system has a blades-open position and a cutting position;
   an electric motor connected to the second body section, and adapted to provide driving power for the blade system, wherein rotation of the electric motor in a first direction is adapted to provide a cutting action in which the blade system moves from the blades-open position towards the cutting position;
   a control system adapted to control the electric motor; and
   a transmission system adapted to transfer power from the electric motor to the blade system, the transmission system comprising a transmission rope, wherein a first end of the transmission rope is connected to the blade system, and a second end of the transmission rope is connected to the electric motor such that rotation of the electric motor in the first direction is adapted to pull the first end of the transmission rope towards the second body section in the longitudinal direction,
   wherein the tree pruner comprises a tension management system adapted to detect a slack rope situation in which tension of the transmission rope is below a predetermined limit value, and the control system is adapted to prevent rotation of the electric motor in a second direction opposite to the first direction as a response to detection of the slack rope situation; and
   wherein the tension management system comprises at least one spring-loaded rope tensioner, wherein the tension management system is adapted to detect the slack rope situation based on a position of the at least one spring-loaded rope tensioner.

2. The tree pruner according to claim 1, wherein the blade system comprises at least one return spring adapted for returning the blade system to the blades-open position if the blade system is deflected therefrom in the direction of the cutting position, and the transmission system comprises a reduction gear having such a transmission ratio between the electric motor and the blade system that the at least one return spring is not capable of rotating the electric motor in the second direction through the transmission system.

3. The tree pruner according to claim 1, wherein the tree pruner comprises a position detection system adapted to detect the cutting position, and the control system is adapted to control the electric motor to rotate in the second direction as a response to the detected cutting position.

4. The tree pruner according to claim 1, wherein the control system comprises an operating switch adapted to be manually operated, wherein the control system is adapted to control the electric motor to rotate in the second direction as a response to a situation in which a user of the tree pruner releases grip from the operating switch.

5. The tree pruner according to claim 1, wherein the transmission system comprises a rope reel adapted to receive a portion of the transmission rope around it, and the electric motor is adapted to rotate the rope reel.

6. The tree pruner according to claim 1, wherein the first blade is stationarily connected relative to the first body section, and the second blade is rotatably connected relative to the first body section, wherein the first blade and second blade are adapted to co-operate as bypass blades for cutting branches.

7. The tree pruner according to claim 1, wherein the first body section is adapted to be rotated relative to the second body section around a rotation axis perpendicular to the longitudinal direction of the pruner body.

8. The tree pruner according to claim 1, wherein the pruner body comprises at least one tube, and the transmission rope extends inside the at least one tube.

9. The tree pruner according to claim 1, wherein the pruner body has a telescopic structure such that a distance between the first body section and the second body section is adjustable.

10. The tree pruner according to claim 1, wherein the transmission rope comprises at least one woven part.

11. The tree pruner according to claim 1, wherein the transmission rope comprises aramid material.

12. The tree pruner according to claim 1, wherein the blade system is adapted such that a movement of the blade system between the blades-open position and the cutting position is provided by an operation movement of the first end of the transmission rope.

13. The tree pruner according to claim 12, wherein the spring-loaded rope tensioner is adapted to receive a tensioning length of the transmission rope such that the spring-loaded rope tensioner is capable of compensating a stretch having a length of the tensioning length.

14. The tree pruner according to claim 13, wherein the tensioning length is less than or equal to 50% of the length of the operation movement.

\* \* \* \* \*